United States Patent
Lu et al.

(10) Patent No.: US 11,878,237 B2
(45) Date of Patent: Jan. 23, 2024

(54) SERVER AND DATA PROCESSING METHOD, APPARATUS, AND SYSTEM

(71) Applicant: HUAWEI TECHNOLOGIES CO., LTD., Guangdong (CN)

(72) Inventors: Zhao Lu, Hangzhou (CN); Shiping Deng, Hangzhou (CN); Sicong Li, Hangzhou (CN); Minjun Zhou, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 818 days.

(21) Appl. No.: 16/984,442

(22) Filed: Aug. 4, 2020

(65) Prior Publication Data
US 2020/0360805 A1    Nov. 19, 2020

Related U.S. Application Data

(63) Continuation of application No. PCT/CN2018/118927, filed on Dec. 3, 2018.

(30) Foreign Application Priority Data

Mar. 6, 2018 (CN) .......................... 201810183257.3

(51) Int. Cl.
A63F 13/355 (2014.01)
G06T 1/20 (2006.01)
H04L 65/61 (2022.01)

(52) U.S. Cl.
CPC .............. *A63F 13/355* (2014.09); *G06T 1/20* (2013.01); *H04L 65/61* (2022.05)

(58) Field of Classification Search
CPC ...... A63F 13/355; A63F 13/352; A63F 13/48; G06T 1/20; H04L 65/61; H04L 65/70;
(Continued)

(56) References Cited

U.S. PATENT DOCUMENTS 11,609,793 B2 * 3/2023 Suh ...................... G06F 9/5066
11,641,405 B2 * 5/2023 Jin ............................ G06T 1/20
709/227
(Continued)

FOREIGN PATENT DOCUMENTS

CN          101931622 A      12/2010
CN          102571900 A       7/2012
(Continued)

OTHER PUBLICATIONS

Office Action dated Mar. 3, 2021, issued in counterpart CN Application No. 201810183257.3, with English Translation. (18 pages).
(Continued)

*Primary Examiner* — Ronald Laneau
(74) *Attorney, Agent, or Firm* — WHDA, LLP

(57) ABSTRACT

This application discloses a server and a data processing method, apparatus, and system. In the method, a first server receives control stream information from a terminal, parses the control stream information, starts a game based on a game ID in the control stream information, and intercepts instruction stream information. An Android stimulator is deployed on the first server. The first server sends the instruction stream information to a second server. The second server is in a graphics processing unit GPU resource pool. The second server selects a target GPU from the GPU resource pool to process the instruction stream information, complete image rendering and encoding, and generate video stream information, and finally the second server sends the video stream information to the terminal. The terminal displays the video stream information to a user.

20 Claims, 6 Drawing Sheets

(58) Field of Classification Search
CPC . H04L 65/403; H04L 65/4061; H04L 65/762; H04L 65/765; H04L 65/80; G06F 9/45504

See application file for complete search history.

(56) References Cited

U.S. PATENT DOCUMENTS

| | | |
|---|---|---|
| 2003/0130040 A1 | 7/2003 | Dripps |
| 2014/0344469 A1* | 11/2014 | Nicholls ............... H04L 65/762 709/231 |
| 2015/0196841 A1 | 7/2015 | Lee |
| 2017/0354878 A1 | 12/2017 | Posin |
| 2019/0172175 A1* | 6/2019 | Chen ...................... G09G 5/006 |
| 2022/0109999 A1* | 4/2022 | K. ......................... H04W 16/32 |

FOREIGN PATENT DOCUMENTS

| | | |
|---|---|---|
| CN | 103023872 A | 4/2013 |
| CN | 103309748 A | 9/2013 |
| CN | 107455346 A | 1/2018 |
| KR | 20150085376 A | 7/2015 |

OTHER PUBLICATIONS

International Search Report dated Mar. 1, 2019, issued in counterpart Application No. PCT/CN2018/118927, with English Translation. (14 pages).

* cited by examiner

SERVER AND DATA PROCESSING METHOD, APPARATUS, AND SYSTEM

CROSS-REFERENCE TO RELATED APPLICATIONS

This is a continuation of International Application No. PCT/CN2018/118927, filed on Dec. 3, 2018, which claims priority to Chinese Patent Application No. 201810183257.3, filed on Mar. 6, 2018. The disclosures of the aforementioned applications are hereby incorporated by reference in their entireties.

TECHNICAL FIELD

This application relates to the cloud computing field, and in particular, to a server and a data processing method, apparatus, and system in a cloud game scenario.

BACKGROUND

With popularization and rapid growth of a terminal game, more game vendors deploy a service in a data center to provide a cloud service for a terminal user.

A cloud game is a currently emerging application scenario of the terminal game, and FIG. 1 is a system architectural diagram of the scenario. A game service is provided by a server of a service cluster and a server of an advanced reduced instruction set computing machines (ARM) server cluster. The service cluster includes a database server on which a database application runs and a service server on which data information of a game is recorded. An ARM server in the ARM server cluster is mainly used to run a cloud game Android stimulator (AVD). Usually, in a cloud game scenario, an instruction stream separation and rendering solution is applied to provide smooth gaming experience for a user. In the solution, the AVD is created on the ARM server in the ARM server cluster, and a game process is started in the AVD. The AVD intercepts an image processing instruction stream and forwards the image processing instruction stream to a terminal, and the terminal completes image rendering and display. According to an essence of the solution, both the game process and a resource consumed by image drawing are controlled on a cloud server. In other words, both the game process and the resource consumed by image drawing are controlled in the AVD of the ARM server cluster. However, with a limited image capability of the ARM server, image rendering performance cannot meet a requirement under concurrency of a plurality of AVDs. Consequently, the image rendering has to be performed on the terminal, which cannot fully meet a service scenario requirement of the cloud game. A graphics processing unit (GPU) of the terminal needs to be used to complete the image rendering. In this case, a better hardware configuration of the terminal is required. When the hardware configuration of the terminal cannot meet a requirement, cloud game experience of the user is affected. In addition, if the AVD is directly deployed on an X86 server in the service cluster for image rendering, because an instruction set of an operating system needs to be translated in a data processing process between an X86 system and an Android system, server performance is greatly affected, high-density concurrency of AVDs cannot be implemented, and costs are high. Therefore, in a current cloud game technical solution, that a game image rendering function is actually implemented on a server without depending on the GPU of the terminal in the cloud game scenario becomes a problem to be urgently resolved.

SUMMARY

This application provides a server and a data processing method, apparatus, and system, to resolve a problem in a current cloud game technical solution that an image rendering function is actually completed on a server without depending on a GPU of a terminal. This improves user experience.

According to a first aspect, a data processing method is provided. In the method, a first server receives control stream information from a terminal, parses the control stream information and an IP address of the terminal, starts a game based on a game identifier (ID) in the control stream information, and intercepts instruction stream information. The first server sends the instruction stream information to a second server. The second server selects a target GPU from a GPU resource pool to process the instruction stream information, complete image rendering and encoding, and generate video stream information, and the second server sends the video stream information to the terminal. The terminal displays the video stream information to a user. The instruction stream information includes content about the game ID and touch input information. A stimulator runs on the first server, and the stimulator is configured to assist the terminal in completing game processing. The first server is in an ARM server cluster and an AVD is deployed on the first server, and the GPU resource pool includes the second server and at least one GPU.

According to the method, a game image rendering process is completed by using the GPU resource pool, to lower a requirement on terminal hardware in a cloud game scenario, improve image rendering processing efficiency, reduce processing duration, and enhance user experience for the game.

In a possible implementation, the GPU resource pool may be formed in any one of the following manners:

Manner 1: The GPU resource pool includes only one second server, and at least one GPU is deployed on the second server.

Manner 2: The GPU resource pool includes only at least one second server, and at least one GPU is deployed on each second server.

Manner 3: The GPU resource pool includes one second server and another server, and at least one GPU is deployed on the another server.

In another possible implementation, an Android operating system is installed on the terminal, and an Android stimulator AVD is pre-installed on the first server. In this case, the AVD invokes an operating system command based on the game ID to start a game process, so that the game process enables, based on the touch input information, the game to run.

In another possible implementation, a process in which the first server intercepts the instruction stream information includes: monitoring a game process ID, and when a new game process ID is detected, obtaining the instruction stream information corresponding to the game process ID.

According to the description of the foregoing process, in the data processing method provided in this application, the first server directly sends the intercepted instruction stream information to the second server in the GPU resource pool. The second server selects the target GPU to complete processing of the instruction stream information, and generate a video stream. The second server transmits the video stream to the terminal by using a TCP/IP (transmission control protocol/Internet protocol) protocol, and the terminal displays and presents the video stream to the user. In comparison with a conventional method, the first server no longer sends the intercepted instruction stream information to the terminal for processing. This reduces terminal load and lowers a requirement on a terminal hardware configuration. In addition, the GPU in the GPU resource pool completes image rendering, a processing capability of the GPU is better than an image processing capability of the terminal, and a configuration of the GPU may be upgraded at any time. Therefore, image rendering processing efficiency is further improved, processing duration is reduced, and cloud transformation is completely performed on a processing process of a cloud game. To be specific, image rendering and processing are completed on a server, and the terminal is only configured to send touch information and display. This fundamentally resolves a problem in the current cloud game technical solution that a game image rendering function is actually completed on the server without depending on the GPU of the terminal, and enhances user experience.

According to a second aspect, this application provides a data processing method. The method includes: receiving, by a second server, instruction stream information sent by a first server, where a GPU resource pool includes the second server and at least one GPU, the first server is used to run a stimulator, and the instruction stream information includes a game identifier (ID), touch input information, and an IP address of a terminal; and selecting, by the second server, a target GPU from the GPU resource pool to parse the instruction stream information, perform image rendering and encoding, and generate video stream information, and sending, by the second server, the video stream information to the terminal based on the IP address of the terminal.

In comparison with a conventional process in which a terminal completes image rendering and image encoding to generate a video stream, in this application, the target GPU encodes a rendered image to generate a video stream, and then a CPU of a server on which the target GPU is located transmits the video stream information to the terminal. The terminal is only configured to display content of the video stream information. This reduces a processing procedure and resource consumption of the terminal. In addition, due to a process in which the GPU in the GPU resource pool completes the image encoding and generation of the video stream information, processing duration can be reduced. The terminal is only configured to display the video stream information, to further enhance user experience.

In a possible implementation, the second server may select the target GPU in any one of the following manners:

Manner 1: A GPU with lightest load is selected as the target GPU based on a load status of each GPU in the GPU resource pool.

Manner 2: A GPU is selected as the target GPU based on an identifier ID of each GPU in the GPU resource pool.

Manner 3: A GPU is randomly selected from the GPU resource pool as the target GPU.

In another possible implementation, the GPU resource pool may be formed in any one of the following manners:

Manner 1: The GPU resource pool includes one second server, and at least one GPU is deployed on the second server.

Manner 2: The GPU resource pool includes at least one server, at least one GPU is deployed on each server, and the second server is one of the servers.

Manner 3: The GPU resource pool includes at least one server and the second server, and at least one GPU is deployed on each server other than the second server.

In another possible implementation, the selecting, by the second server, a target GPU from the GPU resource pool to parse the instruction stream information includes: converting, by the target GPU, OpenGLES (open graphics library for an embedded device) data of the instruction stream information into OpenGL (open graphics library) data based on a mapping table of conversion between a preset OpenGL and an OpenGLES.

In this application, the GPU in the GPU resource pool completes image rendering, so that a requirement on a terminal hardware configuration is lowered, and processing duration is reduced. In comparison with an ARM server, an X86 server in the GPU resource pool is compatible with the GPU in the GPU resource pool. In this embodiment, an advantage of the compatibility between the X86 server and the GPU in the GPU resource pool is fully utilized, to perform rendering and encoding on the instruction stream information, and the instruction stream information is transmitted to the terminal by using a TCP/IP protocol for image display. This enhances user experience. Further, due to the strong advantage of the compatibility between the X86 server and the GPU, a plurality of GPUs may be deployed on a same server, to provide a multi-channel high-performance concurrent image rendering function. In other words, the GPU resource pool may simultaneously process a plurality of pieces of instruction stream information, complete encoding, and generate video stream information. This improves a processing capability of an entire cloud game scenario. In addition, different GPUs on a same server may process a plurality of pieces of instruction stream information. This improves a concurrent processing capability, and further reduces hardware costs in the cloud game scenario.

According to a third aspect, this application provides a data processing apparatus, and the apparatus includes modules configured to perform the data processing method in the first aspect or any one of the possible implementations of the first aspect.

According to a fourth aspect, this application provides a data processing apparatus, and the apparatus includes modules configured to perform the data processing method in the second aspect or any one of the possible implementations of the second aspect.

According to a fifth aspect, this application provides a first server. The first server includes a processor, a memory, and a bus. The processor and the memory are connected to and communicate with each other by using the bus, and the memory is configured to store a computer-executable instruction. When the first server runs, the processor executes the computer-executable instruction in the memory, to perform operation steps of the method in the first aspect or any one of the possible implementations of the first aspect by using a hardware resource in the first server.

According to a sixth aspect, this application provides a second server. The second server includes a processor, a memory, and a bus. The processor and the memory are connected to and communicate with each other by using the bus, and the memory is configured to store a computer-executable instruction. When the second server runs, the processor executes the computer-executable instruction in the memory, to perform operation steps of the method in the second aspect or any one of the possible implementations of the second aspect by using a hardware resource in the second server.

According to a seventh aspect, this application provides a data processing system. The system includes a first server and a second server. The first server is configured to perform operation steps of the method in the fifth aspect or any one of the possible implementations of the fifth aspect, and the second server is configured to perform operation steps of the method in the sixth aspect or any one of the possible implementations of the sixth aspect.

According to an eighth aspect, this application provides a computer-readable storage medium, and the computer-readable storage medium stores an instruction. When the instruction is run on a computer, the computer is enabled to perform the method in the first aspect or any one of the possible implementations of the first aspect.

According to a ninth aspect, this application provides a computer-readable storage medium, and the computer-readable storage medium stores an instruction. When the instruction is run on a computer, the computer is enabled to perform the method in the second aspect or any one of the possible implementations of the second aspect.

In this application, the implementations provided in the foregoing aspects may be further combined to provide more implementations.

DESCRIPTION OF EMBODIMENTS

Figure 1:
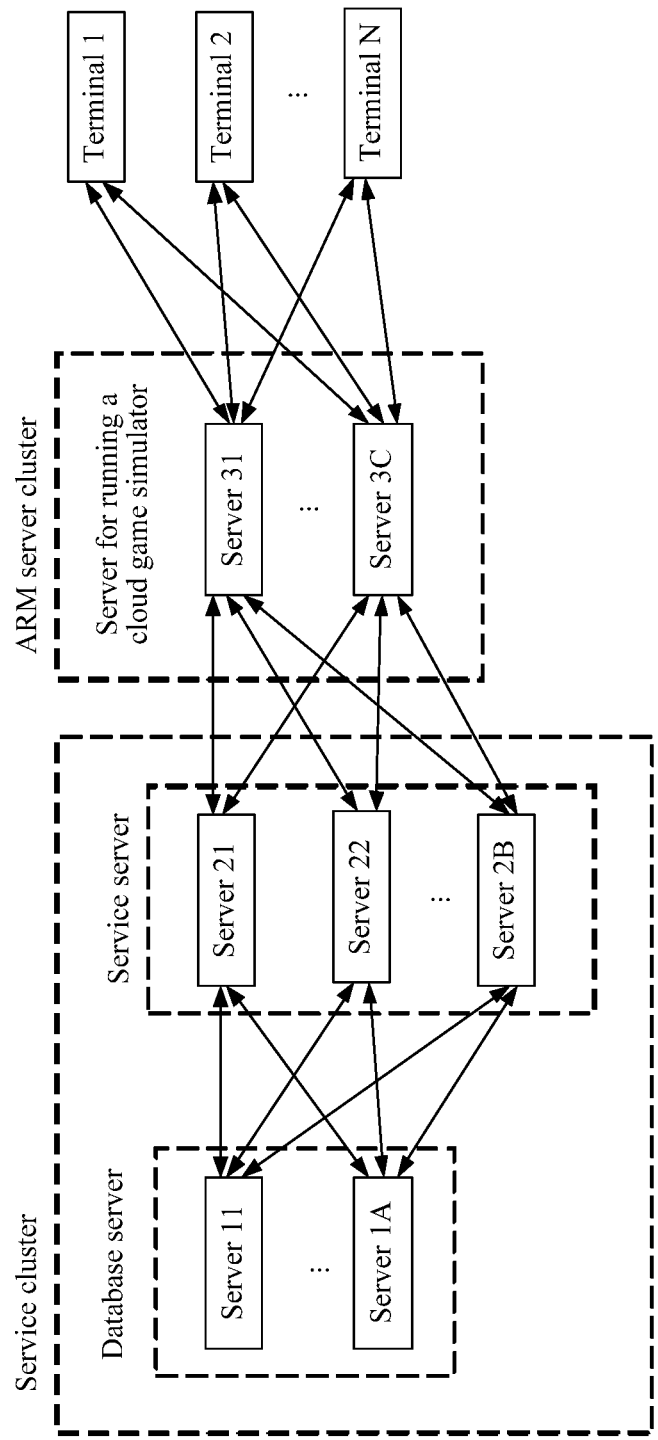
FIG. 1 is a schematic diagram of a system architecture of a cloud game scenario in the related art according to this application.

The following describes the technical solutions in the embodiments of the present application in detail with reference to the accompanying drawings in the embodiments of the present application.

To better describe the embodiments of the present application, a system architecture of a current cloud game scenario is first briefly described with reference to FIG. 1. As shown in the figure, the system architecture of the cloud game scenario includes a service cluster, an advanced reduced instruction set computing machines (ARM) server cluster, and a terminal. The service cluster includes at least one server. The server in the service cluster mainly includes at least one database server on which a database application is deployed and at least one service server on which data information of a game is recorded. The database application herein mainly comprises user information and application configuration information of the game. The data information of the game includes a level and a status of each user, and a current game level and a game device of the user. On the server in the service cluster, a central processing unit (CPU) of an X86 architecture is deployed. The ARM server cluster includes at least one server. A CPU of an ARM architecture is deployed on each server, and the CPU is used to run a game server. Specifically, one or more simulators run on an ARM server. The simulator is specifically a virtual machine. Some operations performed by the user on a specified game by using the terminal may be completed by the simulator. In other words, the simulator may assist the terminal in completing an operation process of the game. A hardware configuration of the ARM server is better than that of the terminal, and the ARM server may quickly communicate with the server in the service cluster in a local area network. Therefore, the stimulator on the ARM server replaces the terminal to complete some processing processes of the game, to improve processing efficiency and user experience.

It should be understood that a main difference between a processor of the X86 architecture and a processor of the ARM architecture lies in a different instruction set used. The processor of the X86 architecture is widely applied to a server and a personal computer (PC), while the processor of the ARM architecture is applied to a terminal, an automatic teller machine (ATM), a vehicle-mounted computer, and the like. The terminal includes a mobile phone and a mobile device (such as a tablet computer and an intelligent terminal). In the cloud game scenario, a game thin client (TC) is deployed on the terminal, and the user may start the game by using the TC on the terminal. In addition, games installed on the terminal include a light-load game, a medium-load game, and a heavy-load game. Classification of light load, medium load, and heavy load is performed based on a computing resource consumed by the terminal and the server during game running.

It should be understood that classification of the light-load game, the medium-load game, and the heavy-load game is performed based on the computing resource consumed by the terminal during game running, which is a relative concept. For example, if a resource that is of the terminal and that may be consumed during game running is used as a criterion, a game that needs to consume 30% of the computing resource during game running may be referred to as a light-load game, for example, Angry Birds. A game that needs to consume 80% of the computing resource during game running is referred to as a heavy-load game, for example, Honor of Kings. A game that needs to consume 50% of the computing resource during game running is referred to as a medium-load game, for example, Fruit Ninja.

It should be further understood that, in the architecture shown in FIG. 1, the database server and the service server in the service cluster may alternatively be deployed as a whole based on a service requirement. In other words, the server on which the database application is deployed is further configured to store the application configuration information of the game. In the following embodiments of the present application, an example in which the database server and the service server are independently deployed is used for description. In addition, division of the server cluster is a logical concept. The service cluster and the ARM server cluster may be combined into one cluster.

Currently, in the cloud game scenario, an instruction stream separation and rendering solution is mainly used to process data. In this solution, a stimulator, for example, an Android stimulator (AVD), is installed on the server in the ARM server cluster. In a specific implementation process, each AVD may be a software module of a virtual machine. When the user starts the game by using the terminal, an image processing instruction stream is intercepted in the AVD and then forwarded to the terminal, and a graphics processing unit (GPU) of the terminal performs image rendering and display. According to an essence of this solution, both a game process and a resource consumed by image drawing are controlled in the ARM server cluster. However, with a limited image capability of the ARM server, image rendering performance cannot meet a requirement under concurrency of a plurality of AVDs. Consequently, the image rendering has to be performed on the terminal, which cannot fully meet a service scenario requirement of a cloud game. In this case, a better hardware configuration of the terminal is required. When the hardware configuration of the terminal (a processor, a GPU video card, a memory, and the like) is common or relatively lower, cloud game experience of the user is affected. In addition, if the image rendering is directly performed in the AVD by using an X86 server in the service cluster, because an instruction set of an operating system needs to be translated in a data processing process between an X86 system and an Android system, server performance is greatly consumed, high-density concurrency of AVDs cannot be implemented, and costs are high. Therefore, in a current cloud game technical solution, that an image rendering function is actually completed on a server without depending on the GPU of the terminal in the cloud game scenario becomes a problem to be urgently resolved.

This application provides a data processing method. Based on the system architecture shown in FIG. 1, a multi-GPU resource pool based on the X86 server is added. A server in the GPU resource pool receives instruction stream information that is forwarded by a cloud game server and that is for a game operation, and distributes the instruction stream information to each GPU for image rendering processing. Then, the instruction stream information is encoded by the GPU to generate a video stream, and the video stream is forwarded to a terminal of each user. The terminal displays video stream information to present a game screen to the user. This reduces a service processing process of the terminal and enhances experience of a terminal user.

Figure 2:
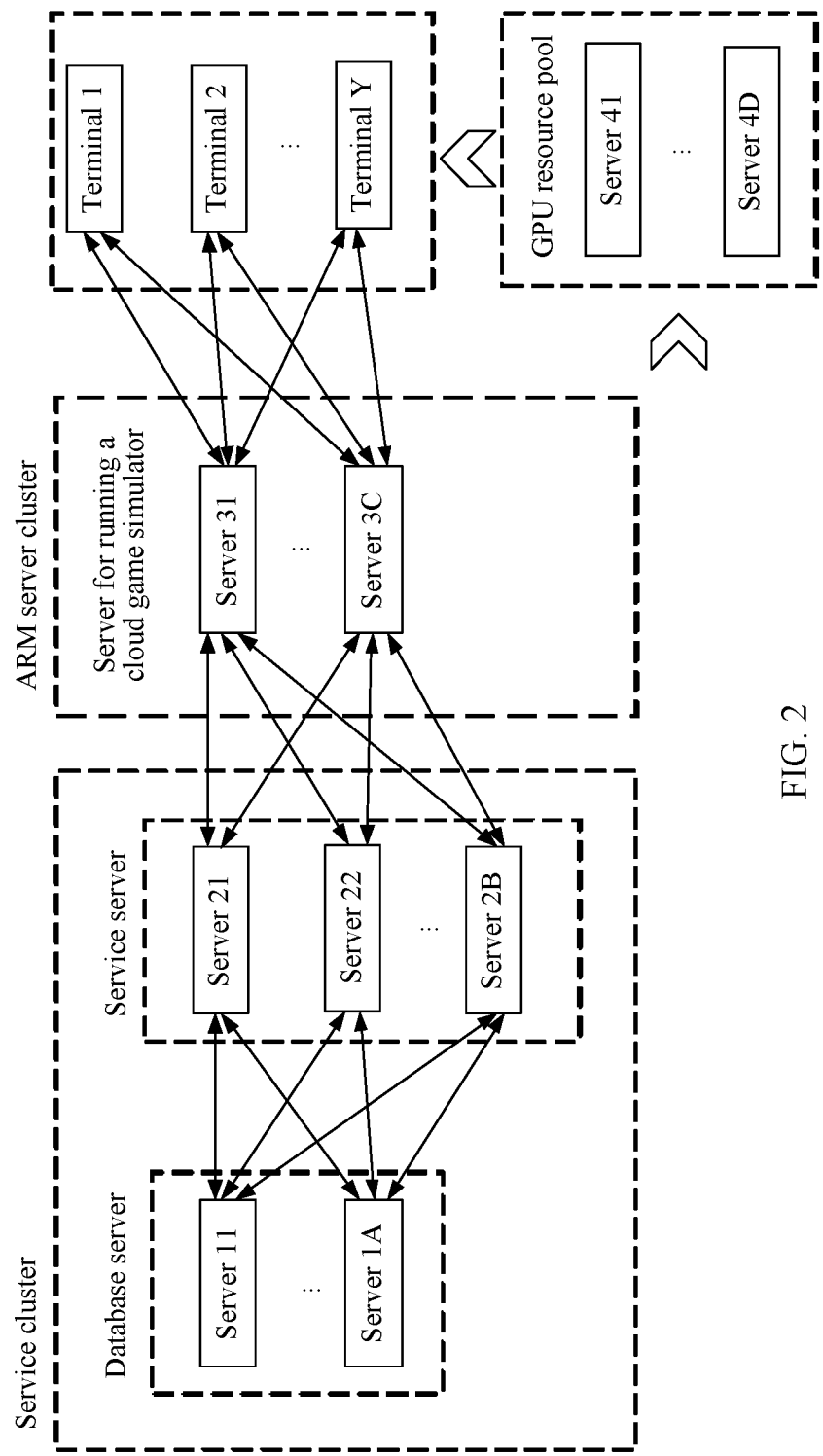
FIG. 2 is a schematic diagram of a system architecture of a cloud game scenario according to this application.

FIG. 2 is a schematic diagram of a system architecture of a cloud game scenario according to this application. As shown in the figure, the system architecture includes a service cluster, an ARM server cluster, a terminal, and a GPU resource pool. The service cluster, the ARM server cluster, and the terminal are the same as those shown in FIG. 1. Details are not described herein again. A difference between FIG. 2 and FIG. 1 lies in that the GPU resource pool is added. The GPU resource pool includes at least one server, and includes at least one GPU. A CPU of an X86 architecture is deployed on each server. The GPU resource pool is configured to receive image instruction stream information forwarded by the service cluster, and distribute the image instruction stream information to each GPU for image rendering processing. Then, the image instruction stream information is encoded by the GPU to generate a game video stream, and a processor of the server forwards the game video stream to a terminal of each user. The GPU is also referred to as a display core, a visual processor, and a display chip, and is a microprocessor that performs image processing on a personal computer, a workstation, a game console, and a mobile device (such as a tablet computer and an intelligent terminal). The GPU is a "heart" of a video card and is similar to a CPU, but the GPU is designed to perform complex mathematical and geometric computation that is necessary for image rendering.

It should be noted that, a message is transmitted in a form of a "message stream" between the terminal and the server in the cloud game scenario. Herein, the message stream is a set carrying a plurality of messages, for example, the instruction stream information, control stream information, and video stream information.

Figure 3:
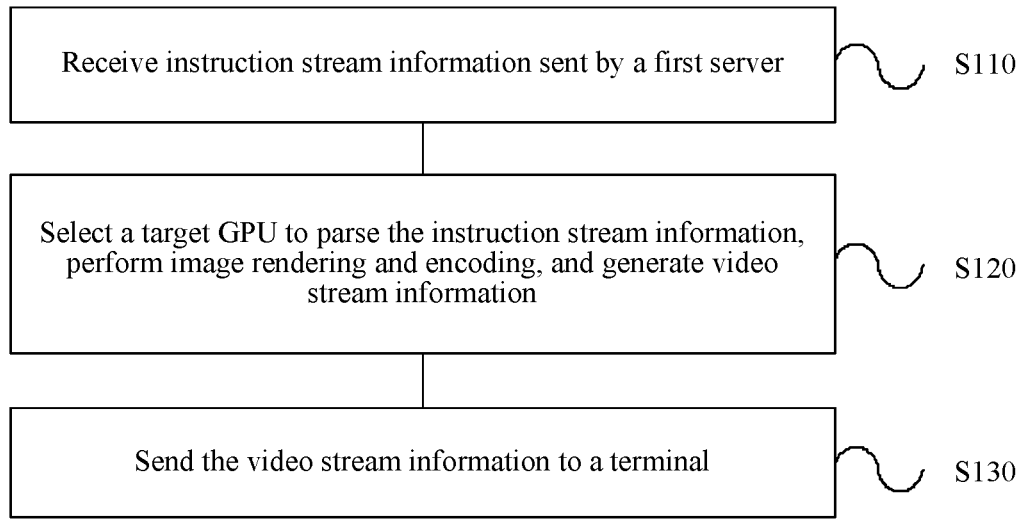
FIG. 3 is a schematic flowchart of a data processing method according to this application.

For ease of subsequent description, how one server in the GPU resource pool processes data is used as an example for description. FIG. 3 is a schematic flowchart of a data processing method according to this application. As shown in the figure, the method 100 includes the following steps.

S110: A second server receives instruction stream information sent by a first server.

The first server is a server on which an AVD corresponding to a game to be operated by a user runs. When intercepting the instruction stream information about the game, the first server directly forwards the instruction stream information to the second server, and the second server further processes the instruction stream information. The second server is any server in a GPU resource pool.

The GPU resource pool may be formed in any one of the following manners:

Manner 1: The GPU resource pool may include only one server. A plurality of GPUs are deployed on the server, and the plurality of GPUs form the GPU resource pool. The server is responsible for receiving the instruction stream information sent by the first server, and selecting one GPU to process data.

Manner 2: The GPU resource pool may include a plurality of servers, each server includes one or more GPUs, and GPUs on all servers jointly form the GPU resource pool. One of the servers is responsible for receiving the instruction stream information sent by the first server, and selecting a GPU in the GPU resource pool to process the data. In this case, because the GPU resource pool needs to concurrently process a plurality of pieces of instruction stream information sent by the AVD on the first server, a management server is required in the GPU resource pool. The management server is responsible for monitoring a load status of each GPU and allocating each piece of instruction stream information to an appropriate GPU for processing, to implement load balancing in the GPU resource pool, improve processing efficiency, and reduce processing duration.

Manner 3: The GPU resource pool includes a plurality of servers. One server is only configured to receive the instruction stream information sent by the first server, and select a GPU from the GPU resource pool to complete processing of the instruction stream information. One or more GPUs are deployed on each of the other servers, and the plurality of GPUs and the server that receives the instruction stream information jointly form the GPU resource pool. A difference between the manner 3 and the manner 2 lies in that in the manner 3, one server is only configured to receive the instruction stream information sent by the first server and distribute the instruction stream information to a specified GPU for processing. No GPU is deployed on the server, and the server does not need to process the instruction stream information. In a scenario of the manner 3, one server is independently configured to process the instruction stream information. When a plurality of pieces of instruction stream information need to be processed at the same time, efficiency of distributing an instruction stream information processing task is improved, and processing time is reduced.

In the three manners, an entity for receiving the instruction stream information sent by the first server in step S110 is different. In the manner 1, the only one server in the GPU resource pool receives the instruction stream information sent by the first server. In the manner 2, any server in the GPU resource pool receives the instruction stream information sent by the first server. The server may be a pre-specified server, or may be a server that first receives the instruction stream information. In this case, the server needs to send a network packet to notify another server in the GPU resource pool that current instruction stream information is to be processed by a target GPU selected by the server. In the manner 3, the server that is only configured to receive the instruction stream information sent by the first server receives the instruction stream information sent by the first server.

In addition, a plurality of GPUs in the GPU resource pool may concurrently process a plurality of pieces of image rendering instruction stream information forwarded by the AVD on the first server. Therefore, there needs to be the second server in the GPU resource pool. The second server is responsible for managing and periodically obtaining usage of each GPU, and allocating an appropriate GPU for processing different instruction stream information from the AVD, to implement load balancing.

Specifically, the second server includes a monitoring module. The monitoring module may be responsible for managing and periodically obtaining the usage of each GPU, and allocating the appropriate GPU for processing the different instruction stream information from the AVD. During specific implementation, the monitoring module may be a software module, or may be manufactured as a coprocessor. The coprocessor is installed on the second server, to accurately and timely manage all GPUs in the GPU resource pool.

It should be noted that, although in the three manners, servers receiving the instruction stream information are different, there are same processes in which a GPU is selected by the servers after the instruction stream information is received. In the following description of this embodiment, the manner 2 is used as an example for further description, and the server receiving the instruction stream information is referred to as the second server.

In addition, in the architecture shown in FIG. 2, data is transmitted between servers and between the terminal and the server based on a TCP/IP protocol. Correspondingly, the instruction stream information includes a game identifier (ID), a socket connection request, and operation information about an open graphics library for an embedded device (OpenGLES). The socket connection request is a connection request message carried in the transmission control protocol/ Internet protocol (TCP/IP), and the socket connection request may include an IP address of the terminal. The OpenGLES is a graphics library upgraded based on an open graphics library (OpenGL). The OpenGLES is mainly applied to an embedded device, for example, an ARM server. The OpenGL is mainly applied to a Linux operating system and a UNIX operating system. The OpenGL is a professional graphic program interface that defines a specification of a cross-programming-language and cross-platform programming interface, and is configured to process a three-dimensional image or a two-dimensional image. The OpenGL is a powerful and easy-to-use underlying graphics library. In addition, the OpenGL is a software interface independent of hardware, and may be ported between different platforms (such as Windows, UNIX, Linux, and MacOS). The OpenGLES is a graphics library that further supports the embedded device in addition to having a function of the OpenGL. According to the operation information of the OpenGLES, touch information from a terminal user is converted into content that may be identified by a system, and the content is specifically an interface parameter in the OpenGLES graphics library. Content of the instruction stream information is essentially an OpenGLES interface used by a game process and a corresponding interface parameter.

S120: The second server selects a target GPU to parse the instruction stream information, and the target GPU completes image rendering and encoding and generates video stream information.

Specifically, the second server selects a GPU to parse the instruction stream information. The GPU selected by the second server may be referred to as the target GPU, and the target GPU is any GPU in the GPU resource pool. The second server may select the target GPU in any one of the following manners:

Manner 1: The second server selects a GPU with lightest load as the target GPU based on load of each GPU in the GPU resource pool.

The second server may record a load status of each GPU in the GPU resource pool. In other words, the second server records information about each GPU such as a current status, usage, and a quantity of pieces of processed instruction stream information. The current status includes an idle state and a busy state. The idle state indicates that a GPU currently does not process the instruction stream information, and the busy state indicates that the GPU currently is processing the instruction stream information.

When receiving to-be-processed instruction stream information, the second server selects, based on a load status that is in the GPU resource pool and that is recorded on the second server, the GPU with lightest load to process the instruction stream information.

Manner 2: The second server selects a GPU from the GPU resource pool as the target GPU based on an ID of the GPU.

When receiving the instruction stream information, the second server may sequentially select one GPU as the target GPU in descending order or ascending order of GPU IDs. For example, when receiving instruction stream information 1, the second server selects a GPU 1 as the target GPU to process the instruction stream information 1. When receiving instruction stream information 2, the second server selects the GPU 2 as the target GPU to process the instruction stream information 2. By analogy, the second server sequentially selects one GPU as the target GPU each time in descending order or ascending order of the GPU IDs.

Manner 3: The second server randomly selects a GPU from the GPU resource pool as the target GPU.

The target GPU parses the instruction stream information, so that the game process learns of operation content for a specified game, and then image rendering is performed on the specified game. The GPU supports the OpenGLES and OpenGLES processing, and stores a mapping table of conversion between the OpenGL and the OpenGLES. It should be understood that the instruction stream information intercepted by the first server is an OpenGLES-based graphics library instruction supporting a terminal. The target GPU needs to convert, based on the mapping table of conversion between the OpenGL and the OpenGLES, the instruction stream information into an OpenGLES-based graphics library instruction supporting a server. Then, the image rendering can be performed on the specified game. An image rendering process of the specified game includes vertex coloring, rasterization, pixel rendering, texture locking, and another process, to generate an image. The target GPU encodes the image to generate video stream information. The video stream information includes an image encoding result. The image may be encoded by using an H.264 encoding method or an H.265 encoding method.

It should be noted that both an image encoding method performed by the GPU and a process of generating a video stream are in the related art, and are not limited in the present application.

S130: The second server sends the video stream information to a terminal.

The second server may send the video stream information to the terminal, and a video stream is displayed on the terminal. To be specific, a result of an operation performed by a user on a game is displayed. That the second server sends the video stream information to the terminal is specifically that a CPU of the second server sends the video stream information to the terminal based on an IP of the terminal in the instruction stream information. In a sending process, data may be transmitted by using the TCP/IP protocol, and may be specifically carried in a real-time transport protocol (RTP) packet. An RTP is a network transmission protocol that provides real-time end-to-end transfer service. According to the RTP, a standard audio data packet and a standard video data packet may be transmitted over the internet. The RTP is widely used in streaming media-related communication and an entertainment field, including a telephone, a video conference, a television, and a network-based push-to-talk service (similar to a walkie-talkie call).

In a possible implementation, when sending the video stream information to the terminal, the second server may alternatively transmit the video stream information by using another network transmission technology such as wireless, infrared, or Bluetooth.

It should be noted that when the GPU resource pool is formed by using the manner 3 in step S110, the target GPU and the second server are not on a same physical server. In this case, a CPU of a server on which the target GPU is located sends the video stream information to the terminal. Optionally, for a forming manner of the GPU resource pool described in the manner 3 in step S110, the video stream information may alternatively be sent, to the second server first, by the CPU of the server on which the target GPU is located, and then be sent by the second server to the terminal.

According to the description of the foregoing process, in the data processing method provided in this embodiment, the GPU in the GPU resource pool completes image rendering and generates a video stream. The video stream is transmitted to the terminal by using the TCP/IP protocol, displayed on the terminal, and presented to the user. In an entire process, the terminal does not need to complete the image rendering, and the target GPU in the GPU resource pool completes a game image rendering processing process. This reduces terminal load and lowers a requirement on a terminal hardware configuration. In addition, the GPU in the GPU resource pool completes the image rendering, and a processing capability of the GPU is better than an image processing capability of the terminal. Therefore, image rendering processing efficiency is further improved, processing duration is reduced, and cloud transformation is completely performed on a processing process of a cloud game. To be specific, image rendering and processing are completed on a server, and the terminal is only configured to send touch information and display. This fundamentally resolves a problem in a current cloud game technical solution that a game image rendering function is actually completed on the server without depending on the GPU of the terminal, and improves user experience. In addition, in comparison with a conventional process in which a terminal completes image rendering and image encoding to generate a video stream, in this application, the target GPU encodes a rendered image to generate a video stream, and then a processor of the server on which the target GPU is located transmits video stream information to the terminal. The terminal is only configured to display content of the video stream information. Therefore, a processing procedure and resource consumption of the terminal are reduced. In addition, in a process in which the GPU in the GPU resource pool completes the image encoding and generation of the video stream information, because the GPU may be upgraded with a service requirement, processing duration can be reduced. The terminal is only configured to display the video stream information, to further enhance user experience.

In a possible implementation, in the system architectural diagram of the cloud game scenario shown in FIG. 2, the GPU resource pool may be configured based on an X86 server and also based on the ARM server. Correspondingly, a configuration of the server in the GPU resource pool may also be implemented in the three manners in step S110. A working process of the ARM server and a working process of the GPU is the same as those in step S110 to step S130. Details are not described herein again.

Figure 4:
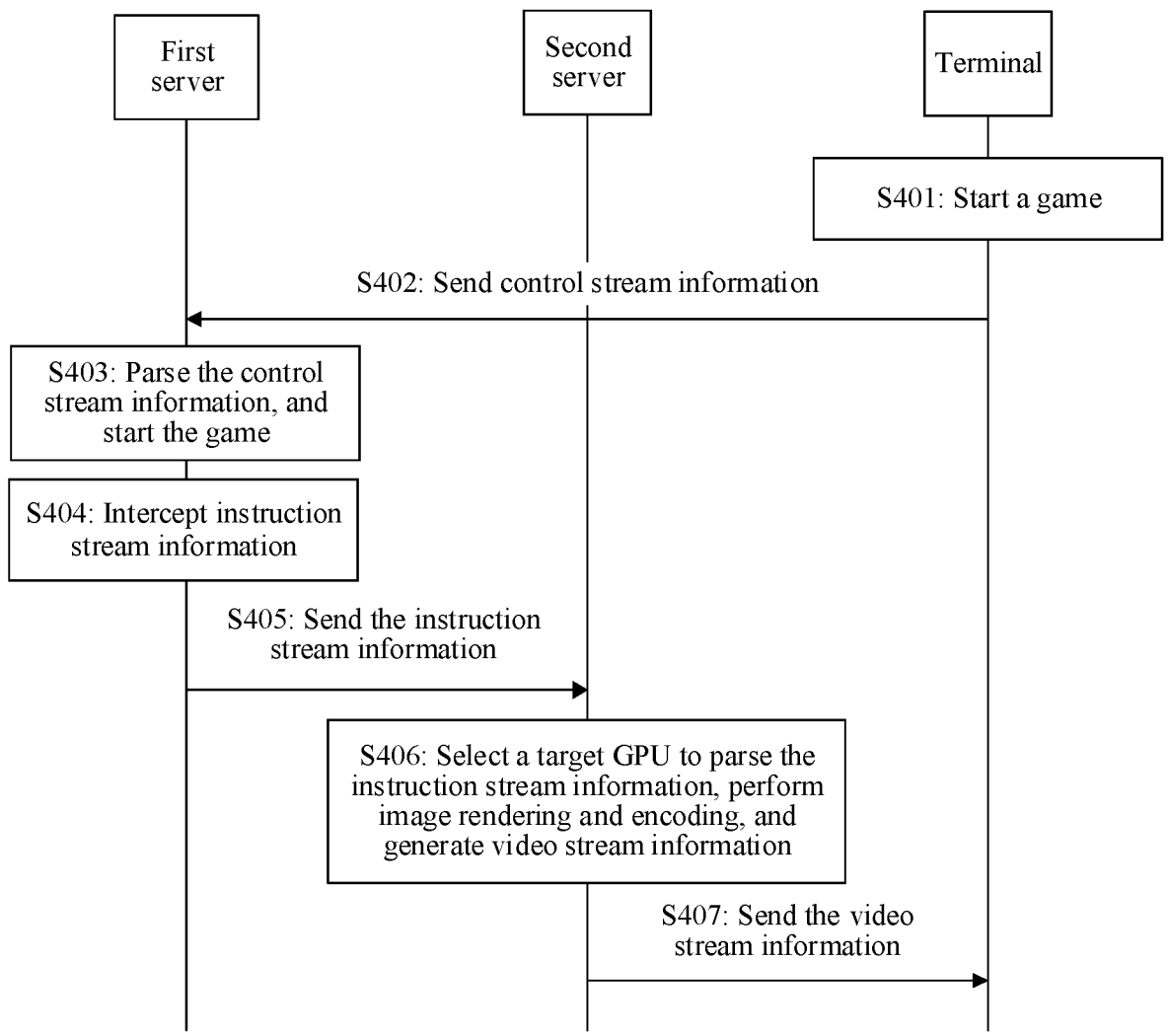
FIG. 4 is a schematic flowchart of another data processing method according to this application.

The following further describes the data processing method provided in this application with reference to FIG. 4. A difference between FIG. 4 and FIG. 3 lies in that, in FIG. 4, the data processing method provided in this application is described from a perspective of interaction processing between a terminal and a server. As shown in FIG. 4, the method includes the following steps.

S401: A user starts a game on the terminal.

Specifically, the user starts the game by using a game TC deployed on the terminal. In this case, the TC generates information. Control stream information includes a socket (socket) connection request of the TC, a game identifier (ID), and touch input information and coordinates obtained after the game is started. The socket connection request is mainly used to establish a TCP connection between the terminal and an ARM server. The touch input information refers to operation information entered by the user on a terminal screen, for example, tapping or dragging 1 cm leftward. The coordinates are location information that is used to indicate an image of a game interface on which the user performs an operation.

S402: The terminal sends the control stream information to a first server.

The first server is any server in an ARM server cluster, and the first server is configured to process the control stream information from the terminal.

One or more AVDs are pre-installed on the first server. In a specific implementation process, one or more AVDs may be pre-specified based on a service requirement to process a game. When the user starts the game on the terminal, one AVD may be selected based on a correspondence between a game identifier (ID) and an AVD to process the control stream information.

Optionally, if there are a plurality of servers in the ARM server cluster, the first server may assume a resource scheduling function. A specific implementation process includes: The first server may record a hardware configuration and a load status of each server in the ARM server cluster, and an AVD is pre-installed on a server in the ARM server cluster based on a quantity of games supported in a cloud game scenario. When receiving the control stream information sent by the terminal, the first server may forward, based on the game ID, the control stream to a specified AVD for processing.

Data is transmitted between the terminal and the first server by using a TCP/IP. According to the TCP/IP protocol, the terminal and the first server first establish a TCP/IP connection through three-way handshake.

It should be understood that there may be a plurality of AVDs on the first server at the same time. When the TCP connection is established between the terminal and the first server, the first server further stores a correspondence between an AVD and a terminal. When receiving the control stream information sent by the terminal, the first server may forward, based on a preset mapping relationship between an AVD and a terminal, the control stream information to the specified AVD for processing.

For example, Table 1 is an example of the preset mapping relationship between an AVD and a terminal in the first server according to this application. When receiving control stream information sent by a terminal 1, the first server may forward the control stream information to an AVD 1 based on the game ID and content in Table 1. The AVD 1 processes a control stream. By analogy, when receiving control stream information sent by a terminal 2, the first server forwards the control stream information to an AVD 2 for processing. When receiving control stream information sent by a terminal 3, the first server forwards the control stream information to an AVD 3 for processing.

TABLE 1

Example of a preset mapping relationship between an AVD and a terminal

|       | Game 1 | Game 2 | Game 3 |
|-------|--------|--------|--------|
| AVD 1 | Yes    | No     | No     |
| AVD 2 | No     | Yes    | No     |
| AVD 3 | No     | No     | Yes    |

S403: The first server parses the control stream information, and starts the game.

Specifically, an AVD that is on the first server and that has a mapping relationship with a game corresponding to the control stream parses the control stream information. The AVD uses the game ID to invoke an operating system command to start a specified game process. After the game is started, the game is operated, based on the touch input information in the control stream information, to be run.

S404: The first server intercepts instruction stream information.

Specifically, an interception process of an image rendering instruction stream is started in an AVD corresponding to the game ID, and the instruction stream information is monitored by the interception process. When new instruction stream information is found, buffer (buffer) content that is in the AVD and that is used to invoke an OpenGLES instruction stream is directly intercepted, and the content includes an interface corresponding to information about an image of an operation performed by the user on a specified game and an interface parameter. After the game is started on the first server, there is a game process corresponding to the game ID. The process is a running process of the game. The first server may store game configuration information, and the configuration information indicates a game supported by the first server. When a system receives a command for starting the specified game, a preset game process is started. In this case, the first server may determine that there is the new instruction stream information, and further intercept the instruction stream information. The instruction stream information refers to a specific operation performed, after the game is started in the AVD, on the game based on the touch control information carried in the control stream information, for example, tapping or dragging leftward. Intercepting the instruction stream information refers to storing instruction stream information with a specified identifier in a memory of the first server. In this case, the instruction stream information exists only in the memory in the system. For the AVD on the first server, after the instruction stream information is intercepted, the game process is still running, but does not execute another task. An image in the AVD is still, and correspondingly, a display interface of the AVD is a white screen.

It should be noted that the instruction stream information is information about an image generated by a plurality of pieces of operation content. After the AVD parses the control stream information, the touch input information in the control stream is converted into a corresponding OpenGLES interface parameter in the game process, and the parameter is stored in continuous storage space in a cache. When the interception process determines that there is a new game process, the instruction stream information may be obtained from a specified cache corresponding to the game process.

S405: The first server sends the instruction stream information to a second server.

S406: The second server selects a GPU to parse the instruction stream information, perform image rendering and encoding, and generate video stream information.

S407: The second server sends the video stream information to the terminal.

A processing process of step S405 to step S407 is the same as that of step S110 to step S130. Details are not described again in this embodiment.

In this embodiment, the GPU in a GPU resource pool completes image rendering, so that a requirement on a terminal hardware configuration is lowered, and processing duration is reduced. In comparison with the ARM server, an X86 server in the GPU resource pool is compatible with the GPU in the GPU resource pool. In this embodiment, an advantage of the compatibility between the X86 server and the GPU in the GPU resource pool is fully utilized, to perform rendering and encoding on the instruction stream information, and the instruction stream information is transmitted to the terminal by using the TCP/IP protocol for image display. This improves user experience. Further, due to the strong advantage of the compatibility between the X86 server and the GPU, a plurality of GPUs may be deployed on a same server, to provide a multi-channel high-performance concurrent image rendering function. In other words, the GPU resource pool may simultaneously process a plurality of pieces of instruction stream information, complete encoding, and generate video stream information. In this way, a processing capability of an entire cloud game scenario is improved. In addition, different GPUs on a same server may process a plurality of pieces of instruction stream information. This improves a concurrent processing capability, and further reduces hardware costs of the cloud game scenario.

In a possible implementation, to enable the second server to quickly send the video stream information to the terminal, a mapping relationship between an AVD and a game identifier (ID) in a server may alternatively be stored in the second server, and the second server is responsible for maintaining and managing the mapping relationship. Correspondingly, in step S402, the terminal sends the instruction stream information to the second server. The second server forwards the control stream to the first server based on the mapping relationship between an AVD and a game ID, and then the first server completes the operation processes in step S403 to step S405.

It should be noted that in this embodiment of this application, that a terminal on which an operating system is installed and an AVD are deployed is used as an example for description. The data processing method in this application is also applicable to a terminal of another operating system and a cloud game architecture, for example, a terminal operating system such as iOS, Firefox OS, or Windows, and a simulator. A hardware resource pool that supports image rendering processing of a corresponding operating system may also be provided. Hardware in the resource pool completes a game image processing process. This reduces a requirement on terminal hardware, improves processing efficiency, reduces processing duration, and further improves user experience.

It should be noted that, for brief description, the method embodiments are described as a combination of a series of actions. However, a person skilled in the art should know that the present application is not limited to the described sequence of the actions.

With reference to FIG. 2 to FIG. 4, the data processing method provided in the embodiments of the present application is described in detail. With reference to FIG. 5 to FIG. 8, the following describes a server and a data processing apparatus and system according to embodiments of the present application.

Figure 5:
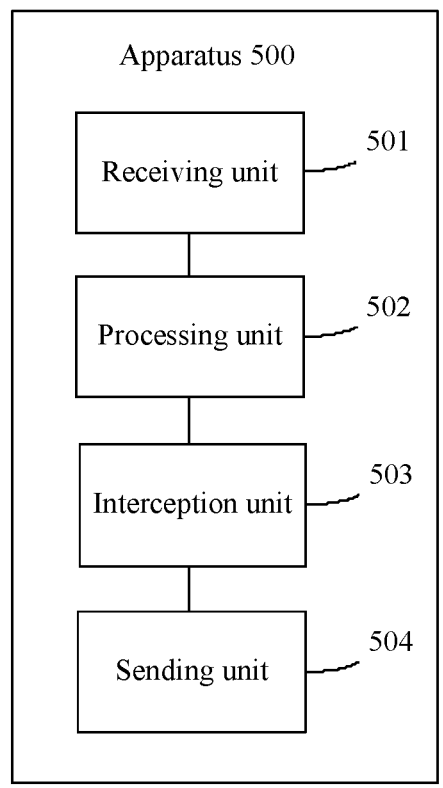
FIG. 5 is a schematic structural diagram of a data processing apparatus according to this application.

FIG. 5 is a schematic structural diagram of a data processing apparatus 500 according to this application. As shown in the figure, the apparatus 500 includes a receiving unit 501, a processing unit 502, an interception unit 503, and a sending unit 504.

The receiving unit 501 is configured to receive control stream information sent by a terminal. The control stream information includes a game identifier (ID), touch input information, and an IP address of the terminal. The touch input information is used to identify an operation performed by a user on a game by using the terminal.

The processing unit 502 is configured to parse the control stream information, and start the game based on the game ID.

The interception unit 503 is configured to intercept instruction stream information, and the instruction stream information includes content indicating the game ID and the touch input information.

The sending unit 504 is configured to send the instruction stream information to a second server, so that the second server selects a target GPU from a graphics processing unit GPU resource pool to process the instruction stream information, complete image rendering and encoding, and generate video stream information, and the second server sends the video stream information to the terminal. The GPU resource pool includes the second server and at least one GPU, and the second server is configured to manage the GPU resource pool.

The apparatus 500 may intercept the instruction stream information, and send the instruction stream information to the second server in the GPU resource pool. The target GPU selected by the second server completes parsing and encoding of an instruction stream, and generates the video stream information. Terminal hardware is not depended on to complete an image rendering process, and a requirement on the terminal hardware is reduced.

Optionally, the GPU resource pool includes only one second server, and at least one GPU is deployed on the second server; or the GPU resource pool includes at least one second server, and at least one GPU is deployed on each of the at least one second server; or the GPU resource pool includes one second server and another server, and at least one GPU is deployed on the another server.

Optionally, an Android operating system is installed on the terminal, and an Android stimulator AVD is pre-installed in the apparatus. That the processing unit 502 parses the control stream information, and starts the game based on the game ID includes:

invoking, by the AVD, an operating system command based on the game ID to start a game process, so that in the game process, the game is operated, based on the touch input information, to be run.

Optionally, that the interception unit 503 intercepts the instruction stream information includes: monitoring a game process ID, and when a new game process ID is detected, obtaining the instruction stream information.

It should be understood that the apparatus 500 in this embodiment of this application may be implemented by using an application-specific integrated circuit (ASIC), or may be implemented by using a programmable logic device (PLD). The PLD may be a complex programmable logic device (CPLD), a field programmable gate array (FPGA), generic array logic (GAL), or any combination thereof. Alternatively, when the data processing method shown in FIG. 3 is implemented by software, the apparatus 500 and the modules of the apparatus may be software modules.

The apparatus 500 according to this embodiment of the present application may correspondingly perform the method described in the embodiments of the present application. In addition, the foregoing and other operations and/or functions of the units in the apparatus 500 are separately used to implement corresponding procedures performed by the first server in the method in FIG. 3 and FIG. 4. For brevity, details are not described herein again.

According to the description of the apparatus 500, the GPU in the GPU resource pool completes the image rendering, and generates a video stream. The video stream is transmitted to the terminal by using a TCP/IP protocol, displayed on the terminal, and presented to the user. In an entire process, the terminal does not need to complete the image rendering, and the target GPU in the GPU resource pool completes a game image rendering processing process. This reduces terminal load and lowers a requirement on a terminal hardware configuration. In addition, the GPU in the GPU resource pool completes the image rendering, and a processing capability of the GPU is better than an image processing capability of the terminal. Therefore, image rendering processing efficiency is further improved, processing duration is reduced, and cloud transformation is completely performed on a processing process of a cloud game. To be specific, image rendering and processing are completed on a server, and the terminal is only configured to send touch information and display. This fundamentally resolves a problem in a current cloud game technical solution that an image rendering function is actually completed on the server without depending on the GPU of the terminal, and improves user experience. In addition, in comparison with a conventional process in which a terminal completes image rendering and image encoding to generate a video stream, in this application, the target GPU encodes a rendered image to generate a video stream, and then video stream information is directly transmitted to the terminal. The terminal is only configured to display content of the video stream information. Therefore, a processing procedure and resource consumption of the terminal are reduced. In addition, due to a process in which the GPU in the GPU resource pool completes the image encoding and generation of the video stream information, processing duration can be reduced. The terminal is only configured to display the video stream information, to further enhance user experience.

Figure 6:
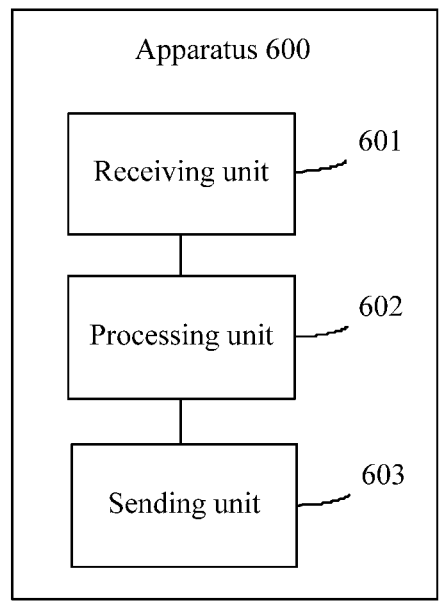
FIG. 6 is a schematic structural diagram of another data processing apparatus according to this application.

FIG. 6 is a schematic structural diagram of another data processing apparatus 600 according to this application. As shown in the figure, the apparatus 600 includes a receiving unit 601, a processing unit 602, and a sending unit 603.

The receiving unit 601 is configured to receive instruction stream information sent by a first server. The apparatus is any server in a GPU resource pool, and the GPU resource pool includes at least one GPU. The first server is used to run a stimulator, and the stimulator is configured to assist a terminal in completing game processing. The instruction stream information includes a game identifier (ID), touch input information, and an IP address of the terminal.

The processing unit 602 is configured to select a target GPU from the GPU resource pool to parse the instruction stream information, perform image rendering and encoding, and generate video stream information.

The sending unit 603 is configured to send the video stream information to the terminal based on the IP address of the terminal.

Optionally, that the processing unit 602 selects the target GPU from the GPU resource pool to parse the instruction stream information includes:

selecting a GPU with lightest load as the target GPU based on a load status of each GPU in the GPU resource pool; or selecting a GPU as the target GPU based on an identifier ID of each GPU in the GPU resource pool; or randomly selecting a GPU from the GPU resource pool as the target GPU.

Optionally, the GPU resource pool includes one apparatus, and at least one GPU is deployed on the apparatus; or the GPU resource pool includes at least one server, at least one GPU is deployed on each of the at least one server, and the apparatus is any one of the at least one server; or the GPU resource pool includes the apparatus and at least one third server, and at least one GPU is deployed on each of the at least one third server.

Optionally, that the processing unit 602 selects the target GPU from the GPU resource pool to parse the instruction stream information includes:

converting, by the target GPU, OpenGLES data of the instruction stream information into OpenGL data based on a mapping table of conversion between a preset open graphics library OpenGL and an open graphics library for an embedded device OpenGLES.

It should be understood that the apparatus 600 in this embodiment of this application may be implemented by using an application-specific integrated circuit (ASIC), or may be implemented by using a programmable logic device (PLD). The PLD may be a complex programmable logic device (CPLD), a field programmable gate array (FPGA), generic array logic (GAL), or any combination thereof. Alternatively, when the data processing method shown in FIG. 3 and FIG. 4 is implemented by software, the apparatus and the modules of the apparatus may be software modules.

The apparatus 600 according to this embodiment of the present application may correspondingly perform the method described in the embodiments of the present application. In addition, the foregoing and other operations and/or functions of the units in the apparatus 600 are separately used to implement corresponding procedures performed by the second server in the method in FIG. 3 and FIG. 4. For brevity, details are not described herein again.

According to the description of the apparatus 600, the GPU in the GPU resource pool completes the image rendering, and generates a video stream. The video stream is transmitted to the terminal by using a TCP/IP protocol, displayed on the terminal, and presented to the user. In an entire process, the terminal does not need to complete the image rendering, and the target GPU in the GPU resource pool completes a game image rendering processing process. This reduces terminal load and lowers a requirement on a terminal hardware configuration. In addition, the GPU in the GPU resource pool completes the image rendering, and a processing capability of the GPU is better than an image processing capability of the terminal. Therefore, image rendering processing efficiency is further improved, processing duration is reduced, and cloud transformation is completely performed on a processing process of a cloud game. To be specific, image rendering and processing are completed on a server, and the terminal is only configured to send touch information and display. This fundamentally resolves a problem in a current cloud game technical solution that an image rendering function is actually completed on the server without depending on the GPU of the terminal, and improves user experience. In addition, in comparison with a conventional process in which a terminal completes image rendering and image encoding to generate a video stream, in this application, the target GPU encodes a rendered image to generate a video stream, and then video stream information is directly transmitted to the terminal. The terminal is only configured to display content of the video stream information. Therefore, a processing procedure and resource consumption of the terminal are reduced. In addition, due to a process in which the GPU in the GPU resource pool completes the image encoding and generation of the video stream information, processing duration can be reduced. The terminal is only configured to display the video stream information, to further enhance user experience.

Figure 7:
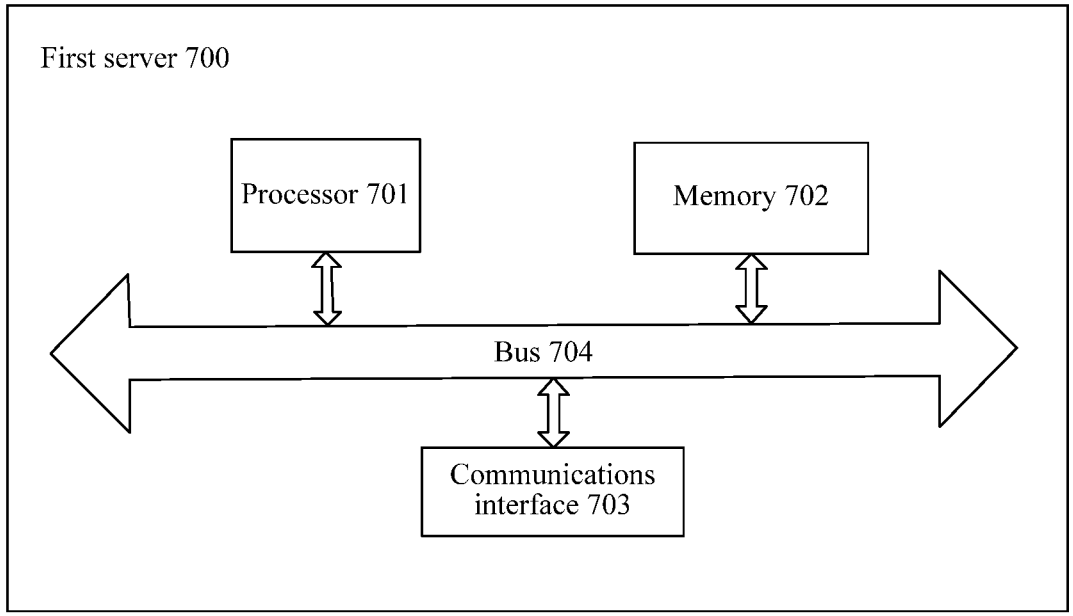
FIG. 7 is a schematic structural diagram of a first server according to this application.

FIG. 7 is a schematic diagram of a first server 700 according to an embodiment of the present application. As shown in the figure, the first server 700 includes a processor 701, a memory 702, a communications interface 703, and a bus 704. The processor 701, the memory 702, and the communications interface 703 communicate with each other by using the bus 704, or may communicate with each other in another manner such as wireless transmission. The memory 702 is configured to store an instruction, and the processor 701 is configured to execute the instruction stored in the memory 702. The memory 702 stores program code, and the processor 701 may invoke the program code stored in the memory 702 to perform the following operations:

receiving control stream information sent by a terminal, where the control stream information includes a game identifier (ID), touch input information, and an IP address of the terminal, and the touch input information is used to identify an operation performed by a user on a game by using the terminal;

parsing the control stream information, and starting the game based on the game ID;

intercepting instruction stream information, where the instruction stream information includes content indicating the game ID and the touch input information; and sending the instruction stream information to a second server, so that the second server selects a target GPU from a graphics processing unit GPU resource pool to process the instruction stream information, complete image rendering and encoding, and generate video stream information, and the second server sends the video stream information to the terminal, where the GPU resource pool includes the second server and at least one GPU.

Optionally, the GPU resource pool includes only one second server, and at least one GPU is deployed on the second server; or the GPU resource pool includes at least one second server, and at least one GPU is deployed on each of the at least one second server; or the GPU resource pool includes one second server and at least one another server, and at least one GPU is deployed on each of the at least one another server.

Optionally, an Android operating system is installed on the terminal, and an Android stimulator AVD is pre-installed in the first server 700. That the first server 700 parses the control stream information, and starts the game based on the game ID includes:

invoking, by the AVD, an operating system command based on the game ID to start a game process, so that in the game process, the game is operated, based on the touch input information, to be run.

Optionally, that the first server 700 intercepts the instruction stream information includes:

monitoring, by the first server, a game process ID, and when detecting that there is a new game process ID, obtaining the instruction stream information.

It should be understood that, in this embodiment of the present application, the processor 701 may be a CPU, or the processor 701 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, any conventional processor, or the like. It should be noted that the processor 701 may support an ARM architecture.

The memory 702 may include a read-only memory and a random access memory, and provide an instruction and data to the processor 701. The memory 702 may further include a nonvolatile random access memory. For example, the memory 702 may further store information about a device type.

The memory 702 may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (random access memory, RAM), used as an external cache. In an example but not limited description, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

In addition to a data bus, the bus 704 may further include a power bus, a control bus, a status signal bus, and the like. However, for clear description, various types of buses in the figure are denoted as the bus 704.

It should be understood that the first server 700 according to this embodiment of the present application may correspond to the data processing apparatus 500 shown in FIG. 5 in the embodiment of the present application, and may correspondingly perform the operation steps performed by the first server in the methods shown in FIG. 3 and FIG. 4 in the embodiments of the present application. In addition, the foregoing and other operations and/or functions of the modules in the first server are separately used to implement corresponding procedures of the methods in FIG. 3 and FIG. 4. For brevity, details are not described herein again.

According to the description of the foregoing process, the GPU in the GPU resource pool completes the image rendering, and generates a video stream. The video stream is transmitted to the terminal by using a TCP/IP protocol, displayed on the terminal, and presented to the user. In an entire process, the terminal does not need to complete the image rendering, and the target GPU in the GPU resource pool completes a game image rendering processing process. This reduces terminal load and lowers a requirement on a terminal hardware configuration. In addition, the GPU in the GPU resource pool completes the image rendering, and a processing capability of the GPU is better than an image processing capability of the terminal. Therefore, image rendering processing efficiency is further improved, processing duration is reduced, and cloud transformation is completely performed on a processing process of a cloud game. To be specific, image rendering and processing are completed on a server, and the terminal is only configured to send touch information and display. This fundamentally resolves a problem in a current cloud game technical solution that an image rendering function is actually completed on the server without depending on the GPU of the terminal, and improves user experience. In addition, in comparison with a conventional process in which a terminal completes image rendering and image encoding to generate a video stream, in this application, the target GPU encodes a rendered image to generate a video stream, and then video stream information is directly transmitted to the terminal. The terminal is only configured to display content of the video stream information. Therefore, a processing procedure and resource consumption of the terminal are reduced. In addition, due to a process in which the GPU in the GPU resource pool completes the image encoding and generation of the video stream information, processing duration can be reduced. The terminal is only configured to display the video stream information, to further enhance user experience.

Figure 8:
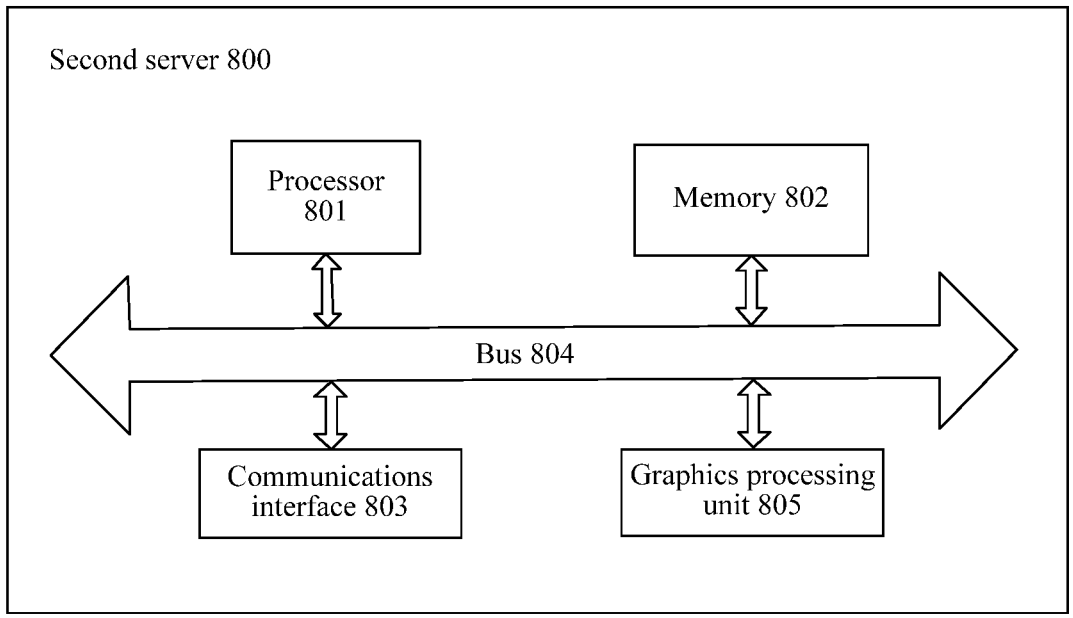
FIG. 8 is a schematic structural diagram of a second server according to this application.

FIG. 8 is a schematic diagram of a second server 800 according to an embodiment of the present application. As shown in the figure, the second server 800 includes a processor 801, a memory 802, a communications interface 803, a bus 804, and a graphics processing unit 805. The processor 801, the memory 802, the communications interface 803, and the graphics processing unit 805 communicate with each other by using the bus 804, or may communicate with each other in another manner such as wireless transmission. The memory 802 is configured to store an instruction, and the processor 801 and the graphics processing unit 805 are configured to execute the instruction stored in the memory 802. The memory 802 stores program code, and the processor 801 and the graphics processing unit 805 may invoke the program code stored in the memory 802 to perform the following operations:

receiving instruction stream information sent by a first server, where the second server is any server in a GPU resource pool, the GPU resource pool includes at least one GPU, the first server is used to run a stimulator, and the instruction stream information includes a game identifier (ID), touch input information, and an IP address of a terminal;

selecting a target GPU from the GPU resource pool to parse the instruction stream information, perform image rendering and encoding, and generate video stream information; and sending the video stream information to the terminal based on the IP address of the terminal.

Optionally, that the second server selects the target GPU from the GPU resource pool to parse the instruction stream information includes:

selecting, by the second server, a GPU with lightest load as the target GPU based on a load status of each GPU in the GPU resource pool; or selecting, by the second server, a GPU as the target GPU based on an identifier ID of each GPU in the GPU resource pool; or randomly selecting, by the second server, a GPU from the GPU resource pool as the target GPU.

Optionally, the GPU resource pool includes one second server 800, and at least one GPU is deployed on the second server 800; or the GPU resource pool includes at least one server, at least one GPU is deployed on each of the at least one server, and the second server 800 is any one of the at least one server; or the GPU resource pool includes the second server 800 and at least one third server, and at least one GPU is deployed on each of the at least one third server.

Optionally, that the second server 800 selects the target GPU from the GPU resource pool to parse the instruction stream information includes: converting, by the target GPU, OpenGLES data of the instruction stream information into OpenGL data based on a mapping table of conversion between a preset open graphics library OpenGL and an open graphics library for an embedded device OpenGLES.

It should be understood that, in this embodiment of the present application, the processor 801 may be a CPU, or the processor 801 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, any conventional processor, or the like.

The memory 802 may include a read-only memory and a random access memory, and provide an instruction and data to the processor 801. The memory 802 may further include a nonvolatile random access memory. For example, the memory 802 may further store information about a device type.

The memory 802 may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. In an example but not limited description, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

In addition to a data bus, the bus 804 may further include a power bus, a control bus, a status signal bus, and the like. However, for clear description, various types of buses in the figure are denoted as the bus 804.

The GPU 805 is a microprocessor that specially performs image computing on a personal computer, a workstation, a game console, and a mobile device (such as a tablet computer or an intelligent terminal).

It should be understood that the second server 800 according to this embodiment of the present application may correspond to the data processing apparatus 600 shown in FIG. 6 in the embodiment of the present application, and may correspondingly perform the operation steps performed by the second server in the methods shown in FIG. 3 and FIG. 4 in the embodiments of the present application. In addition, the foregoing and other operations and/or functions of the modules in the second server are separately used to implement corresponding procedures of the methods in FIG. 3 and FIG. 4. For brevity, details are not described herein again.

According to the description of the foregoing process, the GPU in the GPU resource pool completes the image rendering, and generates a video stream. The video stream is transmitted to the terminal by using a TCP/IP protocol, displayed on the terminal, and presented to the user. In an entire process, the terminal does not need to complete the image rendering, and the target GPU in the GPU resource pool completes a game image rendering processing process. This reduces terminal load and lowers a requirement on a terminal hardware configuration. In addition, the GPU in the GPU resource pool completes the image rendering, and a processing capability of the GPU is better than an image processing capability of the terminal. Therefore, image rendering processing efficiency is further improved, processing duration is reduced, and cloud transformation is completely performed on a processing process of a cloud game. To be specific, image rendering and processing are completed on a server, and the terminal is only configured to send touch information and display. This fundamentally resolves a problem in a current cloud game technical solution that an image rendering function is actually completed on the server without depending on the GPU of the terminal, and improves user experience. In addition, in comparison with a conventional process in which a terminal completes image rendering and image encoding to generate a video stream, in this application, the target GPU encodes a rendered image to generate a video stream, and then video stream information is directly transmitted to the terminal. The terminal is only configured to display content of the video stream information. Therefore, a processing procedure and resource consumption of the terminal are reduced. In addition, due to a process in which the GPU in the GPU resource pool completes the image encoding and generation of the video stream information, processing duration can be reduced. The terminal is only configured to display the video stream information, to further enhance user experience.

An embodiment of the present application further provides a schematic diagram of a system architecture of a cloud game shown in FIG. 3. The system includes a first server and a second server. The first server is configured to perform the operation steps performed by the first server in FIG. 3 or FIG. 4, and the second server is configured to perform the operation steps performed by the second server in FIG. 3 or FIG. 4. Details are not described herein again.

All or some of the foregoing embodiments may be implemented by software, hardware, firmware, or any combination thereof. When the software is used to implement the embodiments, all or some of the foregoing embodiments may be implemented in a form of a computer program product. The computer program product includes one or more computer instructions. When the computer program instructions are loaded or executed on a computer, the procedures or functions according to the embodiments of the present application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center wiredly (for example, a coaxial cable, an optical fiber, or a digital subscriber line (DSL)) or wirelessly (for example, infrared, radio, or microwave). The computer-readable storage medium may be any usable medium accessible by a computer, or a data storage device, such as a server or a data center, including one or more usable medium sets. The usable medium may be a magnetic medium (for example, a floppy disk, a hard disk, or a magnetic tape), an optical medium (for example, a DVD), or a semiconductor medium. The semiconductor medium may be a solid-state drive (SSD).

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint condition of a technical solution. A person skilled in the art can implement the described functions by using different methods for each specific application.

It may be clearly understood by a person skilled in the art that, for convenience and brevity of description, for a specific working process of the system, apparatus, and unit, refer to a corresponding process in the method embodiments. Details are not described herein again.

In the plurality of embodiments provided in this application, it should be understood that, the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, displayed or discussed mutual couplings or direct couplings or communication connections may be indirect couplings or communication connections using some interfaces, apparatuses, or units, and may have an electrical form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in the embodiments.

The foregoing descriptions are merely specific implementations of the present application. Any variation or replacement figured out by a person skilled in the art according to the specific implementations provided in the present application shall fall within the protection scope of the present application.

What is claimed is:

1. A data processing method which is implemented by a server, the method comprising:
   receiving an instruction stream, wherein instruction stream information comprises a game identifier (ID) and an IP address of a terminal;
   selecting a target processor from a processor resource pool to parse the instruction stream information, wherein the processor resource pool comprises at least one processor;
   performing image rendering and encoding, and generating video stream information; and
   sending the video stream information to the terminal based on the IP address of the terminal.

2. The method of claim 1, wherein the selecting the target processor from the processor resource pool to parse the instruction stream information comprises:
   selecting the processor with lightest load as the target processor based on a load status of each processor in the processor resource pool.

3. The method of claim 1, wherein the selecting the target processor from the processor resource pool to parse the instruction stream information comprises:
   selecting the processor as the target processor based on an identifier ID of each processor in the processor resource pool.

4. The method of claim 1, wherein the selecting a target processor from the processor resource pool to parse the instruction stream information comprises:
   randomly selecting the processor from the processor resource pool as the target processor.

5. The method of claim 1, wherein the processor resource pool comprises at least one processor which deploy on any one of the server, a second server and a third server.

6. The method of claim 1, wherein the selecting the target processor from the processor resource pool to parse the instruction stream information comprises:
   converting OpenGLES (open graphics library for an embedded device) data of the instruction stream information into OpenGL (open graphics library) data based on a mapping table of conversion between a preset OpenGL and an OpenGLES.

7. The method of claim 1, wherein the instruction stream further comprises touch input information, an Android operating system is installed on the terminal, and an Android stimulator (AVD) is pre-installed on the server, wherein the AVD invokes an operating system command based on the game ID to start a game process, so that the game process enables, based on the touch input information, a game to run.

8. A server, wherein the server comprises a processor and a memory, the memory is configured to store a computer-executable instruction, and when the server runs, the processor executes the computer-executable instruction in the memory, to perform following operation steps:
   receive an instruction stream, wherein instruction stream information comprises a game identifier (ID) and an IP address of a terminal;
   select a target processor from a processor resource pool to parse the instruction stream information, wherein the processor resource pool comprises at least one processor;
   perform image rendering and encoding, and generate video stream information; and send the video stream information to the terminal based on the IP address of the terminal.

9. The server of claim 8, wherein when the server runs, the processor executes the computer-executable instruction in the memory, to further perform following operation steps:
select the processor with lightest load as the target processor based on a load status of each processor in the processor resource pool.

10. The server of claim 8, wherein when the server runs, the processor executes the computer-executable instruction in the memory, to further perform following operation steps:
select the processor as the target processor based on an identifier ID of each processor in the processor resource pool.

11. The server of claim 8, wherein when the server runs, the processor executes the computer-executable instruction in the memory, to further perform following operation steps:
randomly select the processor from the processor resource pool as the target processor.

12. The server of claim 8, wherein when the server runs, the processor executes the computer-executable instruction in the memory, to further perform following operation steps:
convert OpenGLES (open graphics library for an embedded device) data of the instruction stream information into OpenGL (open graphics library) data based on a mapping table of conversion between a preset OpenGL and an OpenGLES.

13. The server of claim 8, wherein the instruction stream further comprises touch input information, an Android operating system is installed on the terminal, and an Android stimulator (AVD) is pre-installed on the server, wherein
the AVD invokes an operating system command based on the game ID to start a game process, so that the game process enables, based on the touch input information, a game to run.

14. A non-transitory computer-readable storage medium comprising instructions which, when executed by a computer, cause the computer to perform the following steps:
receiving an instruction stream, wherein instruction stream information comprises a game identifier (ID) and an IP address of a terminal;
selecting a target processor from a processor resource pool to parse the instruction stream information, wherein the processor resource pool comprises at least one processor;
performing image rendering and encoding, and generating video stream information; and
sending the video stream information to the terminal based on the IP address of the terminal.

15. The non-transitory computer-readable storage medium of claim 14, when executed by the computer, cause the computer to further perform the following steps:
selecting the processor with lightest load as the target processor based on a load status of each processor in the processor resource pool.

16. The non-transitory computer-readable storage medium of claim 14, when executed by the computer, cause the computer to further perform the following steps:
selecting the processor as the target processor based on an identifier ID of each processor in the processor resource pool.

17. The non-transitory computer-readable storage medium of claim 14, when executed by the computer, cause the computer to further perform the following steps:
randomly selecting the processor from the processor resource pool as the target processor.

18. The non-transitory computer-readable storage medium of claim 14, wherein the processor pool comprises at least one processor which deploy on any one of a first server, a second server and a third server.

19. The non-transitory computer-readable storage medium of claim 14, when executed by the computer, cause the computer to further perform the following steps:
converting OpenGLES (open graphics library for an embedded device) data of the instruction stream information into OpenGL (open graphics library) data based on a mapping table of conversion between a preset OpenGL and an OpenGLES.

20. The non-transitory computer-readable storage medium of claim 14, wherein the instruction stream further comprises touch input information, an Android operating system is installed on the terminal, and an Android stimulator (AVD) is pre-installed on a server, and wherein the AVD invokes an operating system command based on the game ID to start a game process, so that the game process enables, based on the touch input information, a game to run.

* * * * *